(12) United States Patent
Guo et al.

(10) Patent No.: US 12,352,638 B2
(45) Date of Patent: Jul. 8, 2025

(54) SENSOR FOR MEASURING SEATING FORCE OF ENGINE INTAKE AND EXHAUST VALVE AND MEASURING METHOD

(71) Applicant: Harbin Engineering University, Harbin (CN)

(72) Inventors: Jie Guo, Harbin (CN); Shengwei Zhou, Harbin (CN); Guoan Jiang, Harbin (CN); Xinyu Zhang, Harbin (CN)

(73) Assignee: Harbin Engineering University, Harbin (CN)

( * ) Notice: Subject to any disclaimer, the term of this patent is extended or adjusted under 35 U.S.C. 154(b) by 752 days.

(21) Appl. No.: 17/659,581

(22) Filed: Apr. 18, 2022

(65) Prior Publication Data

US 2023/0113870 A1   Apr. 13, 2023

(30) Foreign Application Priority Data

Oct. 8, 2021  (CN) .......................... 202111169649.2

(51) Int. Cl.
*G01L 1/16*   (2006.01)
*F16K 37/00*  (2006.01)

(52) U.S. Cl.
CPC ............ *G01L 1/16* (2013.01); *F16K 37/0041* (2013.01)

(58) Field of Classification Search
CPC ....... G01L 1/16; G01L 5/0028; G01L 23/222; F16K 37/0041; G01M 15/02; G01M 15/042; Y02T 10/12
See application file for complete search history.

(56) References Cited

FOREIGN PATENT DOCUMENTS

| CN | 213451382 U | * | 6/2021 |
| EP | 0179611 B1  | * | 9/1991 |
| JP | H0338672 Y2 | * | 8/1991 |

* cited by examiner

*Primary Examiner* — Mohamad A Musleh
(74) *Attorney, Agent, or Firm* — Fox Rothschild LLP

(57) ABSTRACT

Disclosed are a sensor for measuring seating force of an engine intake and exhaust valve and a measuring method. The sensor comprises a mounting boss, a force bearing element, a piezoelectric element, an annular thin-wall shell and an annular diaphragm with a T-shaped section. Meanwhile, the present disclosure also provides a measuring method by using the sensor. The sensor is simple in mechanism and convenient to use, has certain universality, and can realize the measurement of the impact load of the engine intake and exhaust valve.

10 Claims, 2 Drawing Sheets

SENSOR FOR MEASURING SEATING FORCE OF ENGINE INTAKE AND EXHAUST VALVE AND MEASURING METHOD

CROSS REFERENCE TO RELATED APPLICATION(S)

This patent application claims the benefit and priority of Chinese Patent Application No. 202111169649.2, filed on Oct. 8, 2021, the disclosure of which is incorporated by reference herein in its entirety as part of the present application.

TECHNICAL FIELD

The present disclosure belongs to the technical field of engine performance detection, and particularly relates to a sensor for measuring seating force of an engine intake and exhaust valve.

BACKGROUND ART

The internal combustion engine is regarded as heat energy power equipment with the largest using amount and the widest application, is widely applied to industry, agriculture, transportation and national defense construction, and is the main power of devices such as automobiles, ships, engineering machinery and standby power stations. The vibration and noise of the internal combustion engine cannot be well controlled, so that the working efficiency of the internal combustion engine is influenced, and related power equipment cannot work normally. The valve mechanism is one of important vibration and noise sources of the internal combustion engine, and the working performance of the valve mechanism directly affects the stability, reliability and service life of the internal combustion engine. The device plays a main role in timely opening and closing an inlet valve and an outlet valve according to an ignition sequence between cylinders and a working process in the cylinders, so that the intake of fresh air in the inlet stroke and the discharge of exhaust gas in the exhaust stroke are guaranteed, and the air exchange process of the internal combustion engine is realized. A certain valve gap exists between transmission parts of the valve mechanism, in the opening and closing process of the valve, impact is generated at the contact positions of the transmission parts, on one hand, the elastic part is excited to generate vibration through impact, and on the other hand, impact noise is directly generated; and when the valve is seated, the valve knocks the valve seat, and seating noise is generated, which is the reason for the vibration and noise of the valve mechanism. Along with continuous improvement of the performance of the internal combustion engine, excitation force borne by all parts of the valve mechanism and abrasion between the parts are aggravated, the overall vibration and noise level of the system is also improved, and in order to guarantee good working performance and high service life of the internal combustion engine, higher requirements are provided for low-noise design of the valve mechanism.

The valve seating force is one of the main force sources causing vibration and noise of the valve mechanism of the internal combustion engine and is also an important performance index in the cam profile optimization design, the simulation calculation technology about the valve seating force is gradually mature, test verification and test analysis are indispensable steps in related research of the valve mechanism, and in the two aspects, accurate measurement of the valve seating force is still a big problem due to the fact that the working condition between the valve and the valve seat is poor, the working space is narrow, and conventional measurement means such as strain gauges are difficult to arrange on the valve seat. Most researchers adopt sensors to be arranged on other distribution transmission parts, and the valve seating force is obtained through indirect calculation through the stress relation.

SUMMARY

In order to fill the blank in the technical field of the valve seating force measurement, the present disclosure aims to provide a sensor for measuring seating force of an engine intake and exhaust valve and a measuring method.

The first purpose of the present disclosure is realized as follows: the sensor for measuring seating force of an engine intake and exhaust valve comprises a mounting boss, a force bearing element, a piezoelectric element, an annular thin-wall shell and an annular diaphragm with a T-shaped section; the upper portion of the mounting boss is of a hollow cylinder structure, and the lower portion of the mounting boss is of a hollow circular truncated cone structure; the force bearing element is a circular ring with a right trapezoid section; the piezoelectric element is pressed and fixed through the combined action of the annular thin-wall shell, the annular diaphragm with a T-shaped section and the force bearing element; and the mounting boss, the force bearing element, the piezoelectric element, the annular thin-wall shell and the annular diaphragm with a T-shaped section are connected with one another.

Further, two threaded holes are symmetrically formed in one end face of the hollow cylinder structure on the upper portion of the mounting boss, and a wire outlet groove is formed in the inner wall of the hollow circular truncated cone on the lower portion of the mounting boss along the direction of a bus.

Further, a lead connected with the piezoelectric element penetrates through an inlet channel or an outlet channel in a cylinder cover through a wire outlet groove formed in the inner wall of the hollow circular truncated cone to be connected with an external data acquisition and processing system.

Further, the piezoelectric element is an annular sensitive element made of piezoelectric crystals.

Further, the data acquisition and processing system comprises a charge amplifier and a data acquisition instrument.

Further, a measuring method for seating force of an engine intake and exhaust valve by using the sensor for measuring seating force of an engine intake and exhaust valve, comprising the following steps:

step one, dismantling a tested valve seat ring;

step two, fixing the sensor to the position of a valve seat ring hole through a countersunk bolt;

step three, mounting the valve and a rocker arm assembly on a cylinder cover, so that a valve disc is tightly matched with the inner wall of the force bearing element;

step four, enabling a lead to penetrate through an inlet channel or an outlet channel in the cylinder cover to be connected with a data acquisition and processing system, and setting parameters of the data acquisition and processing system; and step five, starting a reversed towing motor, simulating the real working condition of a valve mechanism, adjusting the different rotating speeds of the reversed towing motor, and periodically impacting the valve and the sensor, wherein charges are generated on the surface of the piezoelectric element after the piezoelectric element is subjected to impact force, and the charges become voltage proportional to external force to be output after amplification of the charge amplifier and impedance change of a measuring circuit, so that the magnitude of the seating force of the valve is obtained.

Compared with the prior art, the present disclosure has the following beneficial effects: in order to overcome the difficulty in directly measuring the air valve seating force, researchers design an air valve seating force sensor based on the design principle of the internal combustion engine, the air valve seating force sensor is in a special shape and is based on the piezoelectric effect, and the air valve seating force sensor can accurately measure the impact load of the air valve when the air valve is seated in an inversed towing state. Moreover, the air valve seat ring is replaced to be matched with the air valve, air suction and exhaust of the cylinder are achieved, and due to the fact that arrangement and wiring of the air valve seat ring do not interfere with other parts of the internal combustion engine, normal work of the valve mechanism is not affected.

The sensor is simple in structure and convenient to use and has certain universality, the real working condition of the engine intake and exhaust valve is restored to the maximum extent in the measuring process, and the measuring result is more real and more convincing.

Figure 1:
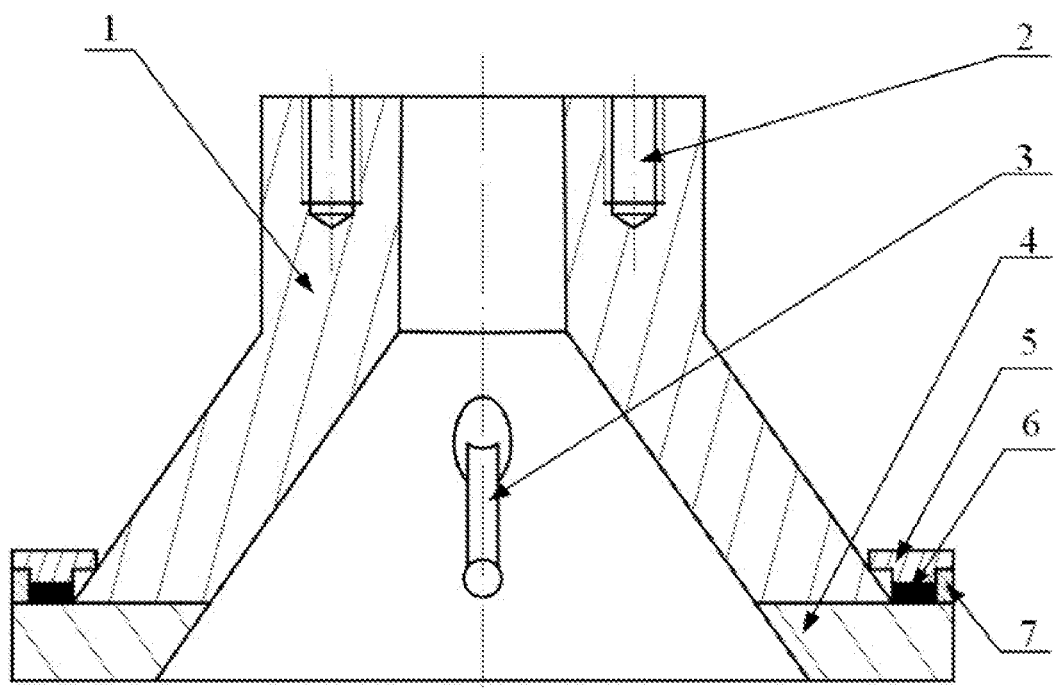
FIG. 1 is a structural schematic diagram of a sensor in the present disclosure.

Reference signs: 1, mounting boss; 2, threaded hole; 3, wire outlet groove; 4, force bearing element; 5, annular diaphragm with T-shaped section; 6, piezoelectric element; 7, annular thin-wall shell; 8, countersunk bolt; 9, valve guide; 10, cylinder cover; 11, sensor; 12, lead; 13, data acquisition and processing system; 14, valve; 15, valve disc; 16, force bearing element taper angle; 17, valve taper angle; 18, maximum outer diameter d1 of valve sealing cone; 19, maximum inner diameter d2 of force bearing element; and 20, seat ring height h.

DETAILED DESCRIPTION OF THE EMBODIMENTS

The present disclosure is further described in conjunction with the attached figures and embodiments.

One of the purposes of the present disclosure is to provide a sensor for measuring seating force of an engine intake and exhaust valve.

One of the purposes of the present disclosure is realized through the following technical scheme: the sensor for measuring seating force of an engine intake and exhaust valve comprises a mounting boss, a force bearing element, a piezoelectric element, an annular thin-wall shell and an annular diaphragm with a T-shaped section; the upper portion of the mounting boss is of a hollow cylinder structure, and the lower portion of the mounting boss is of a hollow circular truncated cone structure; the force bearing element is a circular ring with a right trapezoid section; the piezoelectric element is an annular sensitive element made of piezoelectric crystals, and the piezoelectric element is pressed and fixed through the combined action of the annular thin-wall shell, the annular diaphragm with a T-shaped section and the force bearing element; the overall main geometric dimensions of the force bearing element, the piezoelectric element, the annular thin-wall shell, the annular diaphragm with a T-shaped section of the sensor are kept consistent with a tested valve seat ring, and comprise the seat ring height, the maximum inner diameter of the force bearing element and the force bearing element taper angle; and two threaded holes are symmetrically formed in one end face of the hollow cylinder structure on the upper portion of the mounting boss. A wire outlet groove is formed in the inner wall of the hollow circular truncated cone on the lower portion of the mounting boss along the direction of a bus. A lead connected with the piezoelectric element penetrates through an inlet channel or an outlet channel in a cylinder cover through a wire outlet groove formed in the inner wall of the hollow circular truncated cone to be connected with an external data acquisition and processing system, and the data acquisition and processing system comprises a charge amplifier and a data acquisition instrument. The metal parts of the sensor including the mounting boss, the force bearing element, the annular thin-wall shell and the annular diaphragm with a T-shaped section are connected through a laser welding technology.

The other of the purposes of the present disclosure is to provide a method for measuring seating force of an engine intake and exhaust valve by using the sensor.

The other of the purposes of the present disclosure is realized through the following technical scheme:

The method for measuring seating force of an engine intake and exhaust valve by using the sensor comprises the following steps:

step one, dismantling a tested valve seat ring;

step two, fixing the sensor to the position of an valve seat ring hole through a countersunk bolt;

step three, mounting the valve and a rocker arm assembly on a cylinder cover, so that a valve disc is tightly matched with the inner wall of the force bearing element;

step four, enabling a lead to penetrate through an inlet channel or an outlet channel in the cylinder cover to be connected with a data acquisition and processing system, and setting parameters of the data acquisition and processing system; and step five, starting a reversed towing motor, simulating the real working condition of a valve mechanism, adjusting the different rotating speeds of the reversed towing motor, and periodically impacting the valve and the sensor, wherein charges are generated on the surface of the piezoelectric element after the piezoelectric element is subjected to impact force, and the charges become voltage proportional to external force to be output after amplification of the charge amplifier and impedance change of a measuring circuit, so that the magnitude of the seating force of the valve is obtained.

The embodiment of the present disclosure is given with reference to the following attached figures:

A sensor for measuring seating force of an engine intake and exhaust valve in the present disclosure comprises a mounting boss 1, threaded holes 2, a wire outlet groove 3, a force bearing element 4, an annular diaphragm 5 with a T-shaped section, a piezoelectric element 6 and an annular thin-wall shell 7.

The sensor is a piezoelectric force sensor based on a piezoelectric effect.

Referring to FIG. 1, the sensor comprises a mounting boss 1, the upper portion of the mounting boss 1 is of a hollow cylinder structure, and the lower portion of the mounting boss 1 is of a hollow circular truncated cone structure. Due to the fact that a flow channel opening in an actual cylinder cover is in an irregular shape, in order to guarantee that the sensor does not interfere with an inlet and outlet flow channel opening of the cylinder and meanwhile guarantee enough mounting space, the sensor is designed to be in a mode with a narrow upper portion and a wide lower portion, and a wire outlet groove 3 is formed in the inner wall of the hollow circular truncated cone in the direction of a bus to facilitate lead-out.

The sensor also comprises a force bearing element 4, an annular diaphragm 5 with a T-shaped section, a piezoelectric element 6 and an annular thin-wall shell 7, the force bearing element 4 is a circular ring with a right trapezoid section, the piezoelectric element 6 is an annular sensitive element made of piezoelectric crystals, and the piezoelectric element 6 is pressed and fixed through the combined action of the annular thin-wall shell 7, the annular diaphragm 5 with a T-shaped section and the force bearing element 4; and the metal parts of the sensor including the mounting boss 1, the force bearing element 4, the annular diaphragm 5 with a T-shaped section and the annular thin-wall shell 7 are connected through a laser welding technology. The section of the lower portion of the whole sensor is in a right trapezoid shape, the outer diameter of the force bearing element 4 is larger than the outer diameter of the lower end face of the hollow circular truncated cone, the larger part is used for reserving mounting positions of the annular diaphragm 5, the piezoelectric element 6 and the annular thin-wall shell 7 with a T-shaped section, and meanwhile it is guaranteed that the sensor 11 can be installed in a valve seat ring hole more stably.

Figure 2:
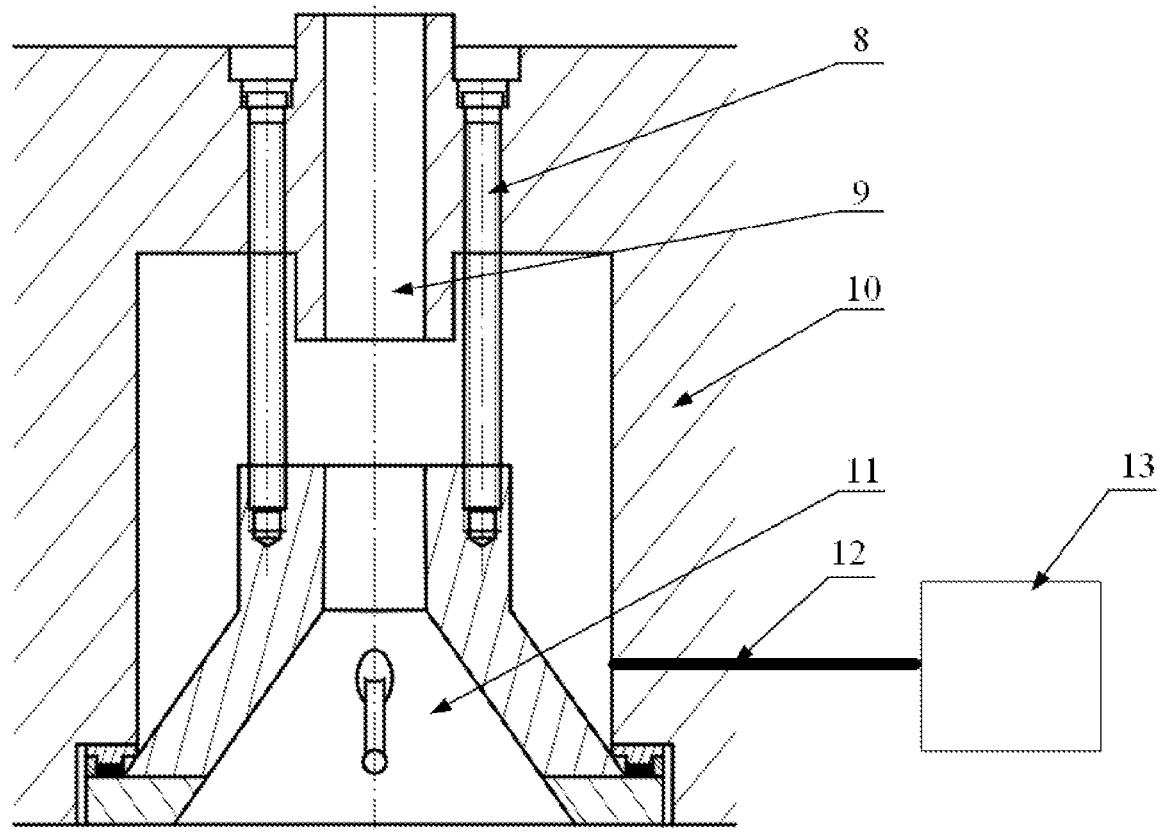
FIG. 2 is a installation diagram of a sensor in a cylinder cover as shown in FIG. 1.

Referring to FIG. 2, the sensor is fixed in the cylinder cover 10 through a countersunk bolt 8, so that the sensor is not loosened in the knocking process of the valve. Meanwhile, it is guaranteed that the outer surfaces of the force bearing element 4, the annular diaphragm 5 with a T-shaped section and the annular thin-wall shell 7 are not in interference contact with the inner surface of the valve seat ring hole, and measurement interference is avoided. Charges are generated on the surface of the piezoelectric element 6 after the piezoelectric element 6 is subjected to impact load of the valve in the force measuring process, and the charges become voltage proportional to external force to be output after amplification of the charge amplifier and impedance change of a measuring circuit, so that the magnitude of the seating force of the valve is obtained.

Figure 3:
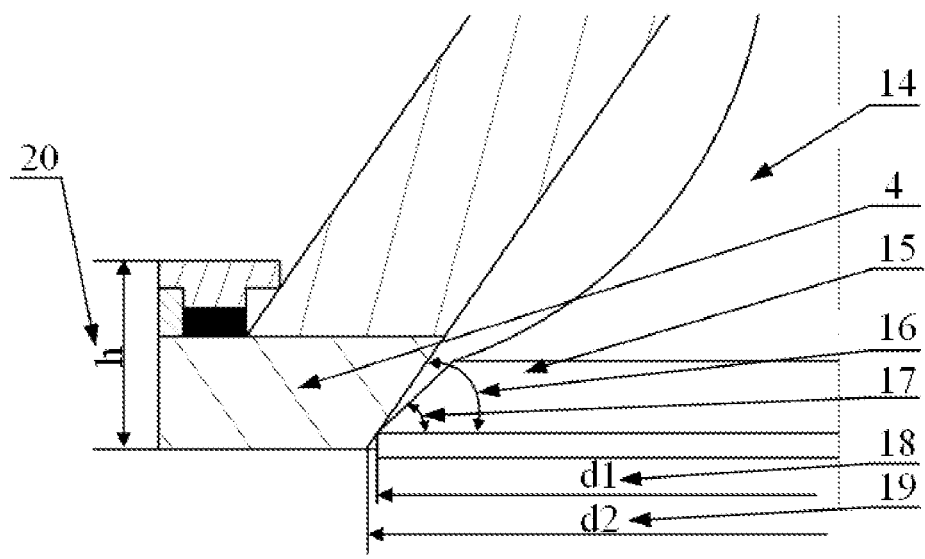
FIG. 3 is a schematic diagram of the relative relation of the fit dimensions of the sensor and a valve as shown in FIG. 1.

Referring to FIG. 3, the force bearing element 4, the annular diaphragm 5 with a T-shaped section, the piezoelectric element 6 and the annular thin-wall shell 7 replace the function of a tested valve seat ring, but the fixed modes are different, and the valve seat ring of the engine is embedded on the cylinder cover and is in interference fit with the cylinder cover. After installation is completed, the conical surface, making contact with the valve, of the seat ring is machined through tools such as a reamer, and a series of processes can cause the seat ring to deform to a certain degree before and after installation; for the sensor, deformation caused by other factors can have great influence on the measuring result, so that the lower portion of the sensor can only be connected and fixed on the cylinder cover through the countersunk bolt 8 at the upper portion after the matched conical surface is firstly processed, and the deformation caused by installation is reduced to the minimum extent.

Meanwhile, according to the design principle of an internal combustion engine, the rigidity of the valve disc 15 and the valve seat ring influences the fit dimensions between the valve disc 15 and the valve seat ring. The sensor is made of precipitation hardening type stainless steel, the hardness of the sensor is larger than that of the valve disc 15, and the conditions that abrasion of the valve 14 is large and abrasion of the sensor is small exist, so that in the design process of the sensor, the maximum inner diameter d2 of the force bearing element is larger than or equal to the maximum outer diameter d1 of a valve sealing cone. Meanwhile, in consideration of reliable sealing of the valve, the force bearing element taper angle 16 is 0.5° to 1° greater than the valve taper angle 17.

The overall main geometric dimensions of the force bearing element 4, the annular diaphragm 5 with a T-shaped section, the piezoelectric element 6 and the annular thin-wall shell 7 are kept consistent with the tested valve seat ring, and comprise the seat ring height 20, the maximum inner diameter 19 of the force bearing element and the force bearing element taper angle 16.

A measuring method in the present disclosure, using the sensor, comprises the following operation steps:

step one, dismantling a tested valve seat ring;

step two, fixing the sensor 11 to the position of a valve seat ring hole through a countersunk bolt 8;

step three, mounting the valve 14 and a rocker arm assembly on a cylinder cover, so that a valve disc 15 is tightly matched with the inner wall of the force bearing element 4;

step four, enabling a lead 12 to penetrate through an inlet channel or an outlet channel in the cylinder cover 10 to be connected with a data acquisition and processing system, and setting parameters of the data acquisition and processing system 13; and step five, starting a reversed towing motor, simulating the real working condition of a valve mechanism, adjusting the different rotating speeds of the reversed towing motor, and periodically impacting the valve and the sensor, wherein charges are generated on the surface of the piezoelectric element after the piezoelectric element is subjected to impact force, and the charges become voltage proportional to external force to be output after amplification of the charge amplifier and impedance change of a measuring circuit, so that the magnitude of the seating force of the valve is obtained.

In conclusion, disclosed are a sensor for measuring seating force of an engine intake and exhaust valve and a measuring method. The sensor comprises a mounting boss, a force bearing element, a piezoelectric element, an annular thin-wall shell and an annular diaphragm with a T-shaped section; the upper portion of the mounting boss is of a hollow cylinder structure, and the lower portion of the mounting boss is of a hollow circular truncated cone structure; the force bearing element is a circular ring with a right trapezoid section; the piezoelectric element is an annular sensitive element made of piezoelectric crystals, and the piezoelectric element is pressed and fixed through the combined action of the annular thin-wall shell, the annular diaphragm with a T-shaped section and the force bearing element; charges are generated on the surface of the piezoelectric element after the piezoelectric element is subjected to stress, and the charges become voltage proportional to external force to be output after change through the data acquisition and processing system, so that the magnitude of the seating force of an air valve is obtained. The data acquisition and processing system comprises a charge amplifier and a data acquisition instrument. The overall main geometric dimensions of the force bearing element, the piezoelectric element, the annular thin-wall shell, the annular diaphragm with a T-shaped section of the sensor are kept consistent with a tested valve seat ring, and comprise the seat ring height, the maximum inner diameter of the force bearing element and the force bearing element taper angle; and the metal parts of the sensor including the mounting boss, the force bearing element, the annular thin-wall shell and the annular diaphragm with a T-shaped section are connected through a laser welding technology. Meanwhile, the present disclosure also provides a measuring method by using the sensor, and the sensor is simple in mechanism and convenient to use, has certain universality, and can realize the measurement of the impact load of the engine intake and exhaust valve.

What is claimed is:

1. A sensor for measuring seating force of an engine intake and exhaust valve, comprising a mounting boss, a force bearing element, a piezoelectric element, an annular thin-wall shell and an annular diaphragm with a T-shaped section, wherein the upper portion of the mounting boss is of a hollow cylinder structure, and the lower portion of the mounting boss is of a hollow circular truncated cone structure; the force bearing element is a circular ring with a right trapezoid section; the piezoelectric element is pressed and fixed through the combined action of the annular thin-wall shell, the annular diaphragm with a T-shaped section and the force bearing element; and the mounting boss, the force bearing element, the piezoelectric element, the annular thin-wall shell and the annular diaphragm with a T-shaped section are connected with one another.

2. The sensor for measuring seating force of an engine intake and exhaust valve according to claim 1, wherein two threaded holes are symmetrically formed in one end face of the hollow cylinder structure on the upper portion of the mounting boss, and a wire outlet groove is formed in the inner wall of the hollow circular truncated cone on the lower portion of the mounting boss along the direction of a bus.

3. The sensor for measuring seating force of an engine intake and exhaust valve according to claim 2, wherein a lead connected with the piezoelectric element penetrates through an inlet channel or an outlet channel in a cylinder cover through a wire outlet groove formed in the inner wall of the hollow circular truncated cone to be connected with an external data acquisition and processing system.

4. The sensor for measuring seating force of an engine intake and exhaust valve according to claim 3, wherein the external data acquisition and processing system comprises a charge amplifier and a data acquisition instrument.

5. The sensor for measuring seating force of an engine intake and exhaust valve according to claim 2, wherein the piezoelectric element is an annular sensitive element made of piezoelectric crystals.

6. The sensor for measuring seating force of an engine intake and exhaust valve according to claim 1, wherein a lead connected with the piezoelectric element penetrates through an inlet channel or an outlet channel in a cylinder cover through a wire outlet groove formed in the inner wall of the hollow circular truncated cone to be connected with an external data acquisition and processing system.

7. The sensor for measuring seating force of an engine intake and exhaust valve according to claim 6, wherein the piezoelectric element is an annular sensitive element made of piezoelectric crystals.

8. The sensor for measuring seating force of an engine intake and exhaust valve according to claim 6, wherein the external data acquisition and processing system comprises a charge amplifier and a data acquisition instrument.

9. A measuring method for seating force of an engine intake and exhaust valve by using the sensor for measuring seating force of an engine intake and exhaust valve according to claim 8, comprising the following steps:
   step one, dismantling a tested valve seat ring;
   step two, fixing the sensor to the position of an valve seat ring hole through a countersunk bolt;
   step three, mounting the valve and a rocker arm assembly on a cylinder cover, so that a valve disc is tightly matched with the inner wall of the force bearing element;
   step four, enabling a lead to penetrate through an inlet channel or an outlet channel in the cylinder cover to be connected with the external data acquisition and processing system, and setting parameters of the external data acquisition and processing system; and
   step five, starting a reversed towing motor, simulating the real working condition of a valve mechanism, adjusting the different rotating speeds of the reversed towing motor, and periodically impacting the valve and the sensor, wherein charges are generated on the surface of the piezoelectric element after the piezoelectric element is subjected to impact force, and the charges become voltage proportional to external force to be output after amplification of the charge amplifier and impedance change of a measuring circuit, so that the magnitude of the seating force of the valve is obtained.

10. The sensor for measuring seating force of an engine intake and exhaust valve according to claim 1, wherein the piezoelectric element is an annular sensitive element made of piezoelectric crystals.

* * * * *